US008869732B1

(12) United States Patent
Chervick

(10) Patent No.: US 8,869,732 B1
(45) Date of Patent: Oct. 28, 2014

(54) BIRD DIVERTER

(75) Inventor: Timothy Michael Chervick, Grantsville, UT (US)

(73) Assignee: AB Hammarprodukter, Bjursås (SE)

( * ) Notice: Subject to any disclaimer, the term of this patent is extended or adjusted under 35 U.S.C. 154(b) by 94 days.

(21) Appl. No.: 12/801,224

(22) Filed: May 27, 2010

Related U.S. Application Data

(60) Provisional application No. 61/213,359, filed on Jun. 2, 2009.

(51) Int. Cl.
*A01M 29/08* (2011.01)

(52) U.S. Cl.
USPC .................................. 116/22 A; 43/2; 40/479

(58) Field of Classification Search
CPC ..... A01M 29/00; A01M 29/08; A01M 31/06; A01K 3/00; A23K 1/00
USPC .......... 116/22 A, 22 R; 43/1–3; 446/228–229, 446/30–31; 119/713; 340/573.2; 40/479, 40/440, 443; D11/131, 141, 116.1; 52/101
See application file for complete search history.

(56) References Cited

U.S. PATENT DOCUMENTS

| 1,794,740 | A | * | 3/1931 | Smith et al. | 40/479 |
| 1,804,617 | A | * | 5/1931 | Horwath | 40/479 |
| 1,906,668 | A | * | 5/1933 | Valk | 40/440 |
| 1,954,721 | A | * | 4/1934 | Whitlow | 40/479 |
| D115,913 | S | * | 8/1939 | Crandall | D11/131 |
| 2,341,583 | A | * | 2/1944 | Tuve | 250/462.1 |
| 2,722,195 | A | * | 11/1955 | Rockafeller | 116/22 A |
| 2,788,762 | A | * | 4/1957 | Wright | 116/22 A |
| 2,803,901 | A | * | 8/1957 | Lane | 40/479 |
| 3,085,545 | A | * | 4/1963 | Ore | 116/22 A |
| 3,221,440 | A | * | 12/1965 | Gutierrez | 446/201 |
| 3,876,080 | A | * | 4/1975 | Hultberg et al. | 211/105.5 |
| 3,934,542 | A | * | 1/1976 | May et al. | 116/63 P |

(Continued)

FOREIGN PATENT DOCUMENTS

WO  WO 2006011990 A2 * 2/2006

OTHER PUBLICATIONS

Derwent abstract, JP 59127752A, Nippon Corban, "Decorative laminated sheet mfr. by laminating sheet and transparent fill with hot embedded decorative particles", published Jul. 23, 1984.*

*Primary Examiner* — R. A. Smith
*Assistant Examiner* — Tania Courson
(74) *Attorney, Agent, or Firm* — Dilworth & Barrese, LLP

(57) ABSTRACT

A diverter for diverting birds away from overhead lines includes a plastic plate substrate having an upper portion and a lower portion. The upper portion is narrower than the lower portion such that a center of gravity is lower. The substrate includes a central portion and triangular-shaped left and right edge portions. The triangular portions are narrow to wide from top to bottom. The central portion includes an opening at an upper portion thereof for attachment to a ring. The central portion includes front and rear flat surfaces each having an upper area and a lower area. One of the front flat surface upper and lower areas includes a first fluorescent retroreflective sheet. One of the rear flat surface upper and lower areas includes a second fluorescent retroreflective sheet. The first and second fluorescent retroreflective sheets having respective contrasting colors. Another one of the front flat surface upper and lower areas and another one of the rear flat surface upper and lower areas includes a luminescent material.

22 Claims, 2 Drawing Sheets

(56) References Cited

U.S. PATENT DOCUMENTS

| | | | |
|---|---|---|---|
| D250,455 S * | 12/1978 | Mohrhauser | D10/116.1 |
| 4,131,079 A * | 12/1978 | Rousseau et al. | 116/22 A |
| D253,528 S * | 11/1979 | Sun | D11/131 |
| D259,628 S * | 6/1981 | Jacobs | D11/141 |
| D279,873 S * | 7/1985 | Neely | D10/116.1 |
| 4,597,357 A * | 7/1986 | LeMessurier | 116/22 A |
| 4,850,798 A * | 7/1989 | Bailey | 416/11 |
| D303,225 S * | 9/1989 | Niebling, Sr. | D10/109.1 |
| D317,419 S * | 6/1991 | Ronzheimer | D10/116.1 |
| 5,595,137 A * | 1/1997 | Delmonte | 116/264 |
| D387,460 S * | 12/1997 | Huang | D26/73 |
| 5,727,980 A * | 3/1998 | Stipa | 446/217 |
| 5,953,841 A * | 9/1999 | Sawyer | 40/479 |
| D436,378 S * | 1/2001 | Carillo et al. | D20/21 |
| 6,742,471 B2 * | 6/2004 | Laidler | 116/22 A |
| 6,760,988 B2 * | 7/2004 | Bardeleben | 40/591 |
| 6,807,765 B2 * | 10/2004 | Watermann | 43/2 |
| 6,833,502 B1 * | 12/2004 | Boatner | 84/402 |
| D500,697 S * | 1/2005 | Cowan | D10/118.1 |
| 6,845,580 B2 * | 1/2005 | Noble | 40/582 |
| 7,063,924 B2 * | 6/2006 | Kaminsky et al. | 430/10 |
| 7,294,861 B2 * | 11/2007 | Schardt et al. | 257/81 |
| D589,565 S * | 3/2009 | Maschino | D20/41 |
| D599,408 S * | 9/2009 | Wormser | D20/21 |
| 7,770,533 B2 * | 8/2010 | Ramirez et al. | 116/209 |
| 7,874,093 B2 * | 1/2011 | Rohrke | 43/2 |
| 7,930,989 B2 * | 4/2011 | Doty et al. | 116/22 A |
| 2003/0029066 A1* | 2/2003 | Venn | 40/493 |
| 2004/0060214 A1* | 4/2004 | Hanley | 40/479 |
| 2004/0098893 A1* | 5/2004 | Bardeleben | 40/479 |
| 2004/0255837 A1* | 12/2004 | Donoho | 116/22 A |
| 2005/0274314 A1* | 12/2005 | Norton et al. | 116/22 A |
| 2006/0164252 A1* | 7/2006 | Richmond | 340/606 |
| 2007/0137883 A1* | 6/2007 | Naidoo | 174/138 F |
| 2007/0190343 A1* | 8/2007 | Arkles | 428/447 |
| 2008/0047191 A1* | 2/2008 | Hally | 43/1 |
| 2008/0178791 A1* | 7/2008 | Sullivan | 116/22 A |
| 2009/0016689 A1* | 1/2009 | Ramirez et al. | 385/137 |
| 2012/0056131 A1* | 3/2012 | Nagel | 252/301.36 |
| 2013/0298845 A1* | 11/2013 | Blanchard | 119/713 |

* cited by examiner

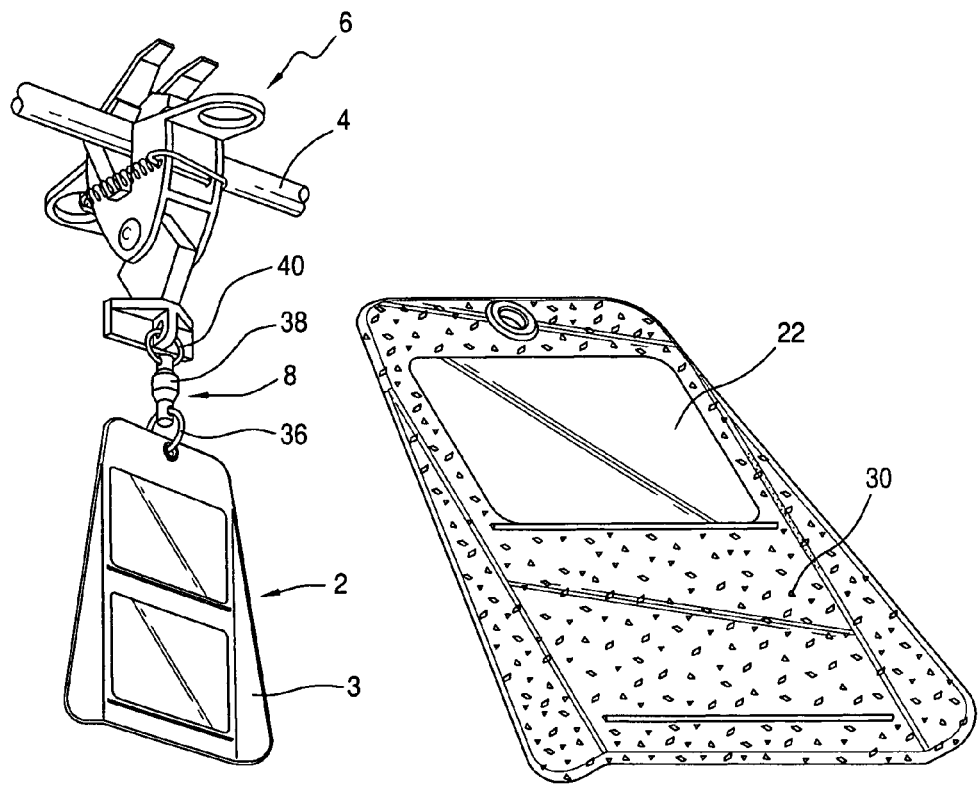
FIG. 1
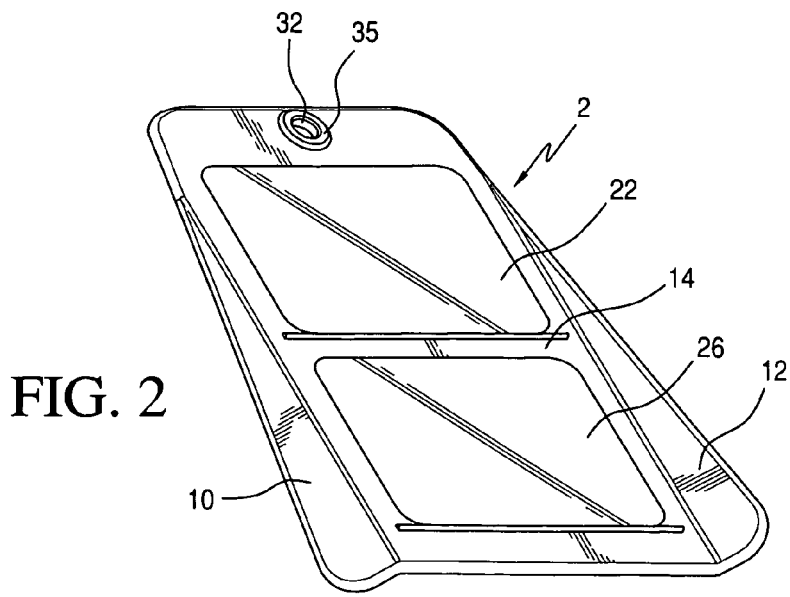
FIG. 2
FIG. 6

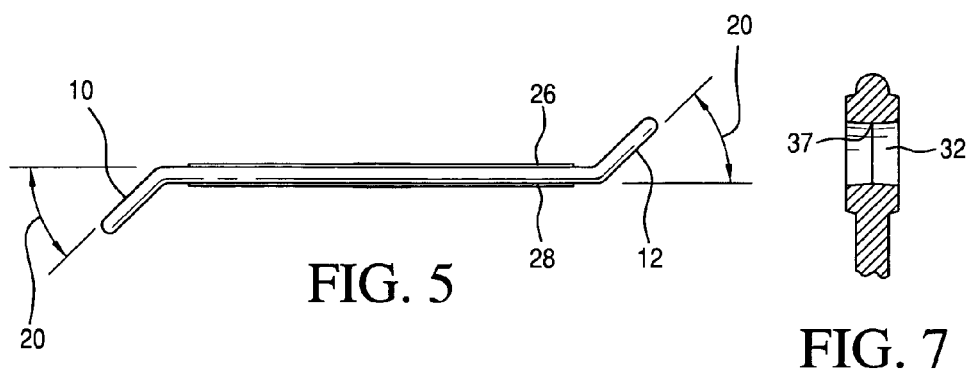
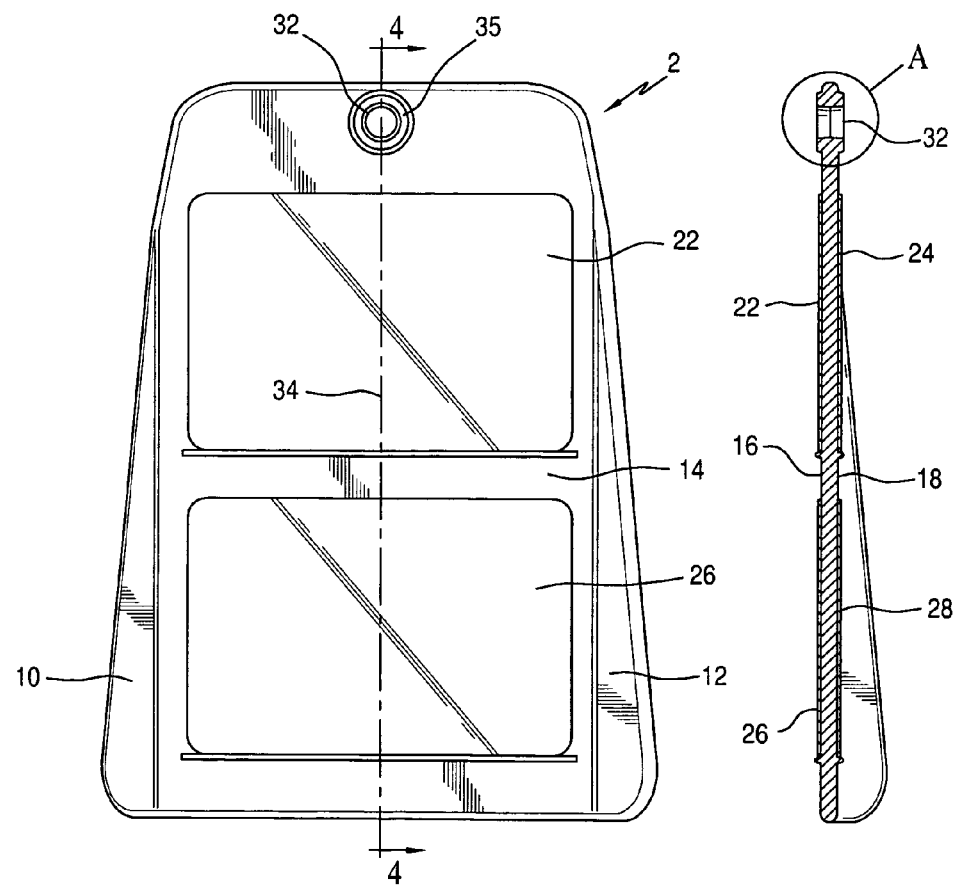

BIRD DIVERTER

RELATED APPLICATION

This is a nonprovisional application claiming the priority benefit of provisional application Ser. No. 61/213,359, filed Jun. 2, 2009, hereby incorporated by reference.

FIELD OF THE INVENTION

The present invention is generally directed to warning devices and particularly to warning devices to scare or divert birds away from structures subject to bird collision such as overhead power lines, guy wires, etc.

SUMMARY OF THE INVENTION

The present invention provides a diverter for diverting birds away from overhead lines, comprising a plastic plate substrate having an upper portion and a lower portion. The upper portion is narrower than the lower portion such that its center of gravity is lower. The substrate includes a central portion and triangular-shaped left and right edge portions. The triangular portions are narrow to wide from top to bottom. The central portion includes an opening at an upper portion thereof for attachment to a ring. The central portion includes front and rear flat surfaces each having an upper area and a lower area. One of the front flat surface upper and lower areas includes a first fluorescent retroreflective sheet. One of the rear flat surface upper and lower areas includes a second fluorescent retroreflective sheet. The first and second fluorescent retroreflective sheets having respective contrasting colors. Another one of the front flat surface upper and lower areas and another one of the rear flat surface upper and lower areas includes a luminescent material.

The substrate is preferably trapezoidal-shaped for a lowered center of gravity. It has a central portion which is substantially rectangular. The luminescent material may be embedded within the substrate. The luminescent material is preferably a sheeting material adhesively attached to lower portions of the front and rear surfaces. The fluorescent orange retroreflective sheet and the fluorescent yellow-green retroreflective sheet are preferably adhesively attached to the substrate. The triangular edge portions are turned at an angle relative to the plane of the substrate in the same direction. The angle is preferably about 45°. The fluorescent orange retroreflective sheet occupies substantially one-half of the front surface. The fluorescent yellow-green retroreflective sheet occupies substantially one-half of the rear surface. The luminescent material is preferably a sheet that occupies substantially one-half of the front or rear surfaces. The several sheets are substantially rectangular. The opening has a wall having with a crown to minimize friction with the attaching ring, thereby affording greater looseness and movement to the substrate in the wind. The substrate is attached to a ring through the opening and a swivel is attached to the ring to allow vertical rotation of the substrate. The first fluorescent retroreflective sheet is orange and the second fluorescent retroreflective sheet is yellow-green.

BRIEF DESCRIPTION OF THE DRAWINGS

FIG. 1 is a perspective view of an embodiment of a diverter made in accordance with the present invention.
FIG. 2 is a perspective view of the diverter shown in FIG. 1.
FIG. 3 is a front elevational view of the diverter shown in FIG. 2.
FIG. 4 is a cross-sectional view taken along line 4-4 in FIG. 3.
FIG. 5 is a bottom end view of FIG. 3.
FIG. 6 is a perspective view of another embodiment of a diverter made in accordance with the present invention.
FIG. 7 is an enlarged detail A showing a crown in the opening.

DETAILED DESCRIPTION OF THE INVENTION

An embodiment of a diverter 2 made in accordance with the present invention is disclosed in FIG. 1. The diverter 2 is attached to an overhead power line 4 through a conventional clamp 6 and a standard swivel assembly 8. The diverter 2 uses light through reflectance and refraction, and motion through rotation, oscillation and vibration to divert birds away from the power line and other structures on which birds typically perch or against which birds may collide.

The diverted 2 is made of a rigid plastic plate substrate 3, such as acrylic translucent plastic, preferably ultraviolet light (u.v.) resistant to withstand typical outdoor environment. The translucent plastic absorbs stray light in low light conditions and will not break down under natural sunlight exposure. This type of plastic advantageously magnifies and enhances the fluorescent material that is applied to the surface of the substrate, as will be discussed below.

The substrate 3 is preferably substantially trapezoidal-shaped, as shown in FIGS. 2 and 3, for a lowered center of gravity. Opposing triangular-shaped left and right edge portions 10 and 12 act as wings to increase rotation and improve aerodynamics of the diverter 2 in the wind. The left and right edge portions 10 and 12 are narrower at the top and wider at the bottom. The edge portions 12 and 10 are turned in the same direction relative to the plane of the substrate central portion 14, as shown in FIG. 5, at an angle 20, preferably at about 45°. Wind tunnel testing has shown that the diverter 2 begins rotation and vibration during periods of 3-5 mph wind in the outside environment. The trapezoidal shape makes the substrate 3 narrower at the top and wider at the bottom to advantageously lower the center of gravity of the diverter 2. A lower center of gravity allows the diverter 2 to maintain its vertical orientation for greater visibility to the birds.

The substrate 3 central portion 14 is substantially rectangular with front and rear flat surfaces 16 and 18, as shown in FIGS. 4 and 5. Fluorescent sheeting materials 22 and 24, preferably rectangular, are adhesively attached to the upper front and rear upper surfaces 16 and 18, as shown in FIGS. 3 and 4. The sheeting materials 22 and 24 advantageously refract and reflect ambient light to make the diverter 2 visible to the birds. Since the substrate 3 is translucent, light can enter within the plastic material and emerge out through the sheeting materials 22 and 24 to help brighten the fluorescent colors. The sheeting materials 22 and 24 each occupies substantially one-half of the respective front and rear surfaces 16 and 18.

Birds utilize refracted light in their feathers for communication and courtship display (e.g. iridescent colors in peacock feathers are refracted light not pigments in the feather structure). The diverter 2 refracts natural sunlight similar to the sunlight refracting from the bird's own feathers. This makes the diverter 2 a man-made feather in reality. Birds can see the diverter 2 and will not sit within about 25 foot radius when the u.v. index is greater than 2.0 (as calculated by the EPA for each city in the USA) and the diverter 2 is rotating or vibrating in the wind.

The sheeting material 22 is preferably fluorescent orange that refracts natural and artificial light. Light is refracted light in the 590 nm range within the spectrum of visible white light. An example of this material is available from 3M, called Fluorescent Orange Prismatic Work Zone Sheeting, described in Product Bulletin 3924S (October 2007), herein incorporated by reference. The sheeting material 22 consists of prismatic lenses formed in a transparent resin, sealed and backed with a pressure-sensitive adhesive and poly liner. The sheeting material 22 is retroreflective. The sheeting material 22 provides the prism or rainbow effect that refracts the spectrum of white light to make the diverter 2 visible to the approaching bird.

The sheeting material 24 is preferably fluorescent yellow-green that refracts natural and artificial light. Light is refracted light in the 570 nm range within the spectrum of visible white light. This material is mounted on the opposite side of the orange material 22 on the substrate 3. An example of this material is available from 3M called Diamond Grade™ Fluorescent VIP Reflective Sheeting, described in Product Bulletin 3980 (September 2005), herein incorporated by reference. The material is a visible-activated fluorescent wide angle prismatic lens reflective sheeting. The sheeting material 24 provides the prism or rainbow effect that refracts the spectrum of white light to make the diverter 2 visible to the approaching bird.

By mounting these different colors on both sides of the diverter 2, the contrast of the colors during rotation, oscillation, and/or vibrations is enhanced to approaching birds and bats and thereby causing the wildlife to avoid collisions with wires and other man-made objects that have been marked with the diverter 2. The sheeting materials 22 and 24 are advantageously mounted on the upper portions of the substrate 3 to place them closer to the wire 4 on to which the diverter 2 is attached. This location is effective in preventing the birds from perching on or near the clamp 6 and covering the sheeting materials with bird droppings.

Fluorescent orange and yellow-green reflective materials advantageously provide daylight (diurnal) peak color to the passing or roosting birds. Research on avian vision has shown that birds in general see 5 times the concentration of fluorescent color than humans. The translucent acrylic plastic substrate 3 enhances the visibility to marked wires to birds and bats during the low-light conditions found during sunrise and sunset periods.

The diverter 2 incorporates tetra chromatic avian vision properties found in bird feathers. Humans utilize only tri-chromatic vision—red, green, and blue colors. Birds utilize tetra (4) chromatic vision—red, green, blue, and ultra violet. Ultra-violet color is invisible to the human naked eye, but visible to birds which have UV rods and cones within their retinas. Humans have no such UV rods and cones. The fluorescent orange and yellow-green sheeting materials 22 and 24 reflect UV-A (long wave) and UV-B (shortwave) sunlight, causing the perching bird to remain at a hazing distance of about 25 feet from the diverter 2.

Luminescent sheeting materials 26 and 28, preferably rectangular, are adhesively attached to the lower front and rear upper surfaces 16 and 18, as shown in FIGS. 3 and 4. The sheeting materials 26 and 28 each occupies substantially one-half of the respective front and rear surfaces 16 and 18. The sheeting materials 26 and 28 advantageously absorb UVA and UVB at 360 nm and below during the daytime and provides light (phosphorescence; glow in the dark) during the nighttime in the 540 nm range. An example of this material is available from 3M, called Luminous Film 6900, describe in Product Bulletin 6900 (June 2002), herein incorporated by reference. The sheeting materials have pressure-sensitive adhesive.

The phosphors in the sheeting materials 26 and 28 absorb UVA and UVB at 360 nm and reflect sunlight by the shiny crystalline structure of zinc sulfide used. Birds can see this as a violet color. This color is not visible to the human eye which cannot see below 400 nm of the visible spectrum of sunlight. The luminescent sheeting materials 26 and 28 are visible to both diurnal and nocturnal bird migration over the marked wires. The phosphorescence of the sheeting materials 26 and 28 advantageously extends visibility to 10-12 hours after sundown to the diverter-marked wires.

Glow crystals 30, such as zinc sulfide and doped strontium aluminate, may be imbedded within the manufactured acrylic plastic substrate 3, as shown in FIG. 6, instead of being applied as a sheeting material on the surface of the substrate 3. After sundown, the translucent acrylic plastic substrate 3 with the embedded glow crystals glows in the dark for 10-12 hours to alert passing birds of an obstruction ahead on the marked wire. The glow in the dark natural crystals absorb and emit purple ultraviolet light visible to the birds as violet but appears as white to humans.

The diverter 2 advantageously makes the wire look larger in diameter to the birds by means of the reflective peak colors during the day and emitting afterglow light in low light, fog, and night time.

The diverter 2 has an opening 32 through its upper end portion through a longitudinal centerline 34 which passes through the center of gravity. The opening 32 is preferably reinforced with raised ridge 35 for durability. The opening 32 is loosely attached to a ring 36, which is loosely attached to a swivel 38 that allows 360 degree rotation in the vertical axis. The swivel 38 is further loosely attached to another ring 40, which is loosely attached to the clamp 6. The opening 32 has a crown 37 in the opening wall to minimize friction between the ring 36 and the opening wall, to promote looseness and freedom of movement of the substrate 3 in the wind.

The swivel 38 allows for rotation about the centerline 34 to give increased contrast to migrating birds and bats by the alternating patterns of yellow-green and orange fluorescent colors given by the sheeting materials 22 and 24 on the opposite sides of the substrate 3. The triangular edge portions 10 and 12 are acted upon by the wind to rotate the diverter 2 like a bullet about the centerline 34.

The loose interconnection of the diverter 2 to the clamp 6 allows for oscillation back and forth movement (wiggling action) in natural wind conditions, increasing visibility to migrating bats and birds approaching diverter-marked wires and structures. The diverter 2 wiggles back and forth about the rings 36 and 40, flashing at approaching birds during windy days.

The diverter 2 when mounted by removable conventional spring-loaded clamp 6 on wires, such as power lines, tower guy wires, and other tensioned wires, vibrates to alert migrating birds and bats to wire collision hazards. The vibration comes from the natural vibration of power lines typically tensioned at 32 lbs per square inch. Research has shown that birds can see very small movement of objects at much greater extent than human beings.

The diverter 2 has been shown to cause a change in flight behavior when applied to power line and other wires suspended in the air. Approaching birds begin to change flight behavior up to ¼ of a mile from the diverter-marked wires, thereby avoiding collisions and injury or death to the birds.

The diverter can be safely applied to energized power line conductor wire up to 115 kV with no coronal emission problems or radio and TV interference. Materials used in the diverter are rated to withstand the natural elements for long periods of time without degradation, typically 5-10 years. The diverter provides visibility in both daylight (diurnal) and nighttime (nocturnal) light conditions. The diverter can be applied by electrical lineman crews on energized wires without having to turn off the power grid during marking of the wires. The diverter is several times more visible to migrating birds and bats, and the diverter can be spaced a greater distance compared to prior art devices, reducing time and cost of installation. Stainless steel material is utilized for all moving parts of the swivel assembly to make them resistant to rust and corrosion by the elements.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A diverter for diverting birds away from structures subject to bird collision, comprising:
   a) a trapezoidally-shaped plastic plate substrate for attachment to a structure to divert birds away therefrom, said substrate for being vertically oriented when attached to the structure, said substrate having an upper portion and a lower portion, said upper portion is narrower than said lower portion such that a center of gravity of said substrate is lower when attached to the structure, said substrate including a central rectangularly-shaped portion and vertically oriented triangular-shaped left and right edge portions, said left and right edge portions being disposed on respective planes oriented at respective angles relative to a plane of said central portion;
   b) said triangular portions being narrow to wide from top to bottom and turned at an angle relative the plane of said substrate in the same direction, and extending substantially parallel to one another;
   c) said central portion including front and rear flat surfaces each having an upper area and a lower area;
   d) one of said front flat surface upper and lower areas including a first fluorescent retroreflective sheet, said one of said rear flat surface upper and lower areas including a second fluorescent retroreflective sheet, said first and second fluorescent retroreflective sheets having respective contrasting colors;
   e) another one of said front flat surface upper and lower areas and another one of said rear flat surface upper and lower areas including a luminescent material; and
   f) said substrate having a device for movable suspension from the structure to divert birds away from the structure by movement during the suspension from the structure.

2. A diverter as in claim 1, wherein:
   a) said front flat surface upper area includes said first fluorescent retroreflective sheet, said rear flat surface upper area includes said second fluorescent retroreflective sheet; and
   b) said front and rear flat surfaces lower areas include said luminescent material.

3. A diverter as in claim 1, wherein said luminescent material is embedded within said substrate.

4. A diverter as in claim 3, wherein said luminescent material includes glow crystals that glow in the dark.

5. A diverter as in claim 4, wherein said glow crystals include zinc sulfide and dope strontium aluminate.

6. A diverter as in claim 1, wherein said luminescent material is a sheeting material adhesively attached to lower portions of said front and rear surfaces.

7. A diverter as in claim 1, wherein said first fluorescent retroreflective sheet and said second fluorescent retroreflective sheet are adhesively attached to said substrate.

8. A diverter as in claim 1, wherein said angle is about 45°.

9. A diverter as in claim 1, wherein:
   a) said first fluorescent retroreflective sheet occupies substantially one-half of said front flat surface;
   b) said second fluorescent retroreflective sheet occupies substantially one-half of said rear flat surface; and
   c) said luminescent material is a sheet that occupies substantially one-half of said front or rear flat surface.

10. A diverter as in claim 9, wherein said sheets are substantially rectangular.

11. A diverter as in claim 1, wherein the device for movable suspension from the structure includes:
    a) said central portion including an opening at an upper portion thereof for attachment to a ring; and
    b) said opening has a wall having a crown.

12. A diverter as in claim 11, and further comprising:
    a) a ring attached to said opening; and
    b) a swivel attached to said ring to allow vertical rotation of said substrate.

13. A diverter as in claim 2, wherein;
    a) said first fluorescent retroreflective sheet is orange; and
    b) said second fluorescent retroreflective sheet is yellow-green.

14. A diverter as in claim 1, wherein the device for movable suspension from the structure includes
    an opening (32) through an upper end portion of the substrate (3) at a longitudinal centerline (34) passing through a center of gravity of the substrate (3).

15. A diverter as in claim 14, where the device for movable suspension from the structure additionally includes
    a first ring (36) attached to the substrate (3) through the opening (32),
    a swivel (38) attached to the ring (36),
    a second ring (40) also attached to the swivel (38), and
    a spring-loaded clamp (6) attached to the second ring (40), the swivel (38) allowing 360° rotation of the substrate (3) about the centerline (34).

16. A diverter as in claim 14, wherein the opening (32) has a through-wall shaped with a crown (37) and is encircled by a raised ridge (35).

17. A diverter for diverting birds away from structures subject to bird collision, comprising:
    a) a translucent plastic plate substrate for absorbing stray light, said substrate for being attached to a structure to divert birds away therefrom, said substrate for being vertically oriented when attached to the structure, said substrate having an upper portion and a lower portion;
    b) said substrate including front and rear flat surfaces each having an upper area and a lower area;
    c) one of said front flat surface upper and lower areas including a first fluorescent retroreflective sheet, said one of said rear flat surface upper and lower areas including a second fluorescent retroreflective sheet, said first and second fluorescent retroreflective sheets having respective contrasting colors, light entering said translucent plastic plate substrate emerges through said first and second fluorescent retroreflective sheets to brighten said first and second fluorescent retroreflective sheets and said first and second fluorescent retroreflective sheets each being bounded on all sides by said translucent substrate; and
    d) another one of said front flat surface upper and lower areas including a first sheet of luminescent material and another one of said rear flat surface upper and lower areas including a second sheet of luminescent material, said first and second sheets of luminescent material each b in bounded on all sides b said translucent substrate; and e) said substrate having device for movable suspension from the structure to divert birds away from the structure by movement during the suspension from the structure.

18. A diverter as in claim 17, wherein:
a) said substrate includes an upper port on and a lower portion; and
b) said upper portion is narrower than said lower portion.

19. A diverter for diverting birds away from structures subject to bird collision, comprising:
a) a translucent plastic plate substrate for absorbing stray light, said substrate for being attached to a structure to divert birds away therefrom, said substrate for being vertically oriented when attached to the structure, said substrate having an upper portion and a lower portion, said substrate including a central portion and vertically oriented left and right edge portions;
b) said central portion including front and rear flat surfaces each having an upper area and a lower area;
c) one of said front flat surface upper and lower areas including a first fluorescent retroreflective sheet. said one of said rear flat surface upper and lover areas including a second fluorescent retroreflective sheet, said first and second fluorescent retroreflective sheets having respective contrasting colors, light entering said translucent plastic plate substrate emerges through said first and second fluorescent retroreflective sheets to brighten said first and second fluorescent retroreflective sheets and said first and second fluorescent retroreflective sheets each being bounded on all sides by said translucent substrate;
d) said translucent plastic plate substrate including glow crystals that glow in the dark, said glow crystals are embedded in said translucent plastic plate substrate; and
e) said substrate having a device for movable suspension from the structure to divert birds away from the structure by movement during the suspension from the structure.

20. A diverter s in claim 19, wherein said glow crystals include zinc sulfide and dope strontium aluminate.

21. A diverter as in claim 19, wherein said glow crystals emit purple ultraviolet light visible to the birds.

22. A diverter as in claim 19, wherein:
a) said substrate includes an upper portion and a lower portion; and
b) said upper portion is narrower than said lower portion.

* * * * *